(12) United States Patent
Hertrich et al.

(10) Patent No.: US 11,245,526 B2
(45) Date of Patent: Feb. 8, 2022

(54) FULL-DUPLEX PASSWORD-LESS AUTHENTICATION

(71) Applicant: Identité, Inc., Clearwater, FL (US)

(72) Inventors: John P. Hertrich, Clearwater, FL (US); Mohammad Mozdurani Shiraz, Minsk (BY)

(73) Assignee: Identité, Inc., Clearwater, FL (US)

( * ) Notice: Subject to any disclaimer, the term of this patent is extended or adjusted under 35 U.S.C. 154(b) by 0 days.

(21) Appl. No.: 17/094,845

(22) Filed: Nov. 11, 2020

(65) Prior Publication Data

US 2021/0176059 A1 Jun. 10, 2021

Related U.S. Application Data

(60) Provisional application No. 62/943,837, filed on Dec. 5, 2019.

(51) Int. Cl.
| | | |
|---|---|---|
| *H04L 29/06* | (2006.01) | |
| *H04L 9/32* | (2006.01) | |
| *H04L 9/30* | (2006.01) | |

(52) U.S. Cl.
CPC .......... *H04L 9/3213* (2013.01); *H04L 9/3073* (2013.01); *H04L 9/3228* (2013.01); *H04L 9/3268* (2013.01); *H04L 9/3271* (2013.01)

(58) Field of Classification Search
None
See application file for complete search history.

(56) References Cited

U.S. PATENT DOCUMENTS

| | | |
|---|---|---|
| 8,190,876 B2 | 5/2012 | Schneider |
| 8,627,438 B1 | 1/2014 | Bhimanaik |
| 9,111,270 B2 * | 8/2015 | Fujisawa .............. G06Q 20/385 |
| 9,537,661 B2 | 1/2017 | Khalil et al. |
| 9,805,182 B1 * | 10/2017 | Kayyidavazhiyil ..... G06F 21/35 |
| 10,250,636 B2 | 4/2019 | Vissamsetty et al. |
| 10,277,577 B2 | 4/2019 | Cox |
| 10,282,612 B2 | 5/2019 | Hunt et al. |
| 10,360,561 B2 | 7/2019 | Poon et al. |
| 10,362,026 B2 | 7/2019 | Johansson et al. |
| 10,375,081 B2 | 8/2019 | Anderson |
| 11,101,986 B2 * | 8/2021 | Carmignani ......... H04L 63/0853 |
| 2006/0177056 A1 | 8/2006 | Rostin et al. |
| 2012/0066749 A1 * | 3/2012 | Taugbol .................. G06F 21/40 |
| | | 726/6 |
| 2012/0124651 A1 * | 5/2012 | Ganesan ............... H04L 9/3226 |
| | | 726/4 |
| 2012/0240204 A1 * | 9/2012 | Bhatnagar ............... G06F 21/30 |
| | | 726/5 |

(Continued)

*Primary Examiner* — Jeffery L Williams
(74) *Attorney, Agent, or Firm* — Larson & Larson, P.A.; Frank Liebenow; Justin P. Miller

(57) ABSTRACT

Upon an attempt to access a service of a third-party server, full-duplex password-less authentication provides a one-time password to the user displayed at the client device and at a mobile device associated with the user. The user verifies the access by comparing the one-time password displayed at the mobile device and the one-time password displayed at the client device. The one-time password is displayed as a combination of a picture and a set of alphanumeric characters for ease in making the comparison. The user determines whether to accept or deny the authentication sequence after a simple visual comparison.

19 Claims, 12 Drawing Sheets

(56) References Cited

U.S. PATENT DOCUMENTS

| | | | |
|---|---|---|---|
| 2015/0249540 A1* | 9/2015 | Khalil | H04L 9/3268 |
| | | | 713/158 |
| 2017/0250974 A1* | 8/2017 | Antonyraj | H04W 12/04 |
| 2019/0182050 A1 | 6/2019 | Famechon et al. | |
| 2020/0162258 A1* | 5/2020 | Woo | H04L 9/0872 |

* cited by examiner

FULL-DUPLEX PASSWORD-LESS AUTHENTICATION

CROSS-REFERENCE TO RELATED APPLICATION

This application claims the benefit of U.S. provisional application No. 62/943,837 filed on Dec. 5, 2019, the disclosure of which is incorporated by reference.

FIELD

This invention relates to the field of online security and more particularly to a system for full-duplex password-less authentication that is resilient to cyber intrusions.

BACKGROUND

Computer security is difficult with many security risks. Current systems designed to reduce security risks result in added access difficulties and burdens of passwords for users and organizations. These difficulties and burdens have led to a rapid growth of password substitution methods. Some of these methods are secure but slow and difficult to operate with and others sacrifice security for user convenience. Hardware tokens are one secure method of authentication, but are not scalable, are expensive, are easy to lose, and are not cloud based and still require passwords and the maintenance of passwords. Legacy authentication with passwords requires a second factor authentication such as push notification, an SMS message, or a phone call, slowing down the authentication process.

There are many social engineering attacks reported every week. Social engineering attacks, describe a broad range of malicious tricks used by hackers to gain a victim's trust. The methods used are becoming increasingly more elaborate and sophisticated. To prevent social engineering and hacking attempts, users need to have the tools to protect their online digital world. Authentication at login is the first gateway to the users' digital world. This gateway must be as strong as possible to protect a user's valuable assets from attack.

Here is a daunting array of attacks currently being used: Man-in-the-Middle-Phishing-Pharming-Malware, Ransomware-Password Guessing-OTP Interception-Wiretapping-SIM Cloning-Cross Site Scripting-Parallel Session Attack-Server Side Data Breaking-Shoulder Surfing-Reuse password attack-Theft of Authenticator-Channel Vulnerabilities-Brute Force & Dictionary-Replay-Stored Browser Passwords-Sniffing-Smartcard Loss or Cloning Attack. While this list is extensive, they all rely of some basic weakness to trick either the user of the service provider. Now we shall examine how a few of these attacks function.

A man-in-the-middle attack is carried out by hackers who insert themselves in the communications path. Being in the communication path between the different parties gains access to all the information sent to and from both the parties. The hacker can stop the users from sending and receiving data, copy and save the data, or might even divert and redirect the messages. The main objective of man-in-the-middle attack (MiM) is to eavesdrop the users' conversation. They mask their presence, making everything appear normal. The parties are unaware there is no third person involved in the communication. A man-in-the-middle attack allows the hacker to steal user login credentials, financial details, and credit card numbers and so on.

Weak and not properly encrypted connections between the user devices and a portal that provides services allows the man-in-the-middle to intercept data while weak encrypted messages allow the man-in-the-middle to extract the important information from those messages including, for example, usernames, passwords, credit card numbers, pin codes and many more important personal information.

What is needed is a system that will provide user authentication for using a service of a portal without requiring the user to remember/enter a password.

SUMMARY

The full-duplex password-less authentication both maximizes security and simplifies the authentication process for the end user as well as the service provider. The full-duplex password-less authentication is highly secure and avoids the use of passwords, which can be lost or stolen, and are often written on paper so the user can remember their complicated passwords.

User authentication of the prior art is typically achieved by requiring a user to enter a password in order to verify the user's identity. Requiring a password for user authentication is often inefficient and open to attack. Passwords are forgotten, hacked, stolen, misplaced, reused across several systems, etc., and are often a major security risk. Moreover, such authentication systems rely solely on authenticating the user for the service, as the identity and authentication of the service is not provided for the user. Embodiments of the full-duplex password-less authentication service described will reduce reliance on passwords and increase overall security for the user and the service by providing a mechanism to conduct a password-less mutual authentication for both the service and for the user.

The full-duplex password-less authentication service first provides a one-time password to each user, and then, the users verify if the corresponding service is authentic by comparing the one-time service password generated and displayed on the mobile application and the one-time server password generated on an authentication server that is displayed on the client device. This one-time password is displayed as a combination of a picture and a set of alphanumeric characters to make it easier for the user to make this comparison. The user determines whether to accept or deny the authentication sequence by a simple visual comparison between the alphanumeric characters and the picture displayed at each of the client device and the mobile device. The full-duplex password-less authentication service verifies if the user is authentic by generating and sending the one-time password internally when the user verifies the one-time password. The authentication server further authenticates the device being used by the user and the third-party server via a set of public key interface cryptographically secure keys that are generated and shared between the corresponding parties. The full-duplex password-less authentication service is applicable to virtually all service areas that utilize existing user password or second step verification.

In one embodiment, a computer implemented method for full-duplex authentication of a user of a third-party server without requiring a password from the user is disclosed. The computer implemented method includes pre-registering a mobile device of the user with an authentication server including generating a key pair comprising a public key and a private key, storing the private key at the mobile device, sending the public key to the authentication server, and after receiving the public key, the authentication server storing the public key in a storage of the authentication server (e.g. for future secure connections). After a client device of the user sends a request including a user-ID to access the third-party server to the third-party server. The third-party server establishes a secure connection with the authentication server and the authentication server validates the third-party server by way of a digital certificate. The third-party server sends an authentication request that includes the user-ID to the authentication server. The authentication server determines the mobile device of the user based upon the user-ID. The authentication server generates a one-time password and, from such, generates a picture and a code and sends the picture and the code to the third-party server. Responsive to receiving the picture and the code, the third-party server forwards the picture and the code to the client device where it is displayed. The authentication server connects to the mobile device (e.g., by a push notification server for a preliminary connection and then the authentication server connecting to the mobile device through an encrypted channel thereafter, the push server sending credentials to the mobile device) and sends the one-time password to the mobile device. The mobile device generates and displays the picture and the code from the one-time password. The mobile device receives an input indicative of a comparison of the picture and the code displayed on the mobile device with the picture and the code displayed at the client device and when the input indicates a match, the request to access the third-party server is valid and the mobile device sending an authentication acknowledgment token to the authentication server and responsive to the authentication server receiving the authentication acknowledgment token, the authentication server sends a transaction to the third-party server to grant access of the third-party server by the client device.

In another embodiment, a system for full-duplex authentication of a user of a third-party server is disclosed. The user has a client device and a mobile device. The system includes an authentication server. Software running on the mobile device pre-registers the mobile device with the authentication server, generates a key pair comprising a public key and a private key, and sends the public key to the authentication server through a communications network. Software running on the authentication server receives and stores the public key in a memory of the authentication server. When the software running on the third-party server receives a request to authenticate the user from the client device, the software running on the third-party server establishes a secure connection with the authentication server. The software running on the authentication server generates a one-time password and generates a similar image with alphanumeric characters from the one-time password and forwards the similar image with alphanumeric characters to the software running on the third-party server which sends the similar image with alphanumeric characters to the client device where the similar image with alphanumeric characters are displayed. The similar image with alphanumeric characters is displayed at the client device in a format consisting of a selected image (e.g. one image out of 1000 images) and an alpha and/or numeric string (e.g. three numeric digits, a letter and two numeric digits, two or three letters). Software running on the mobile device receives the one-time password from the authentication server then generates and displays an image with alphanumeric characters (visual form of the one-time password). The software running on the mobile device receives an input indicative of a visual comparison between the similar image and alphanumeric characters with the image and alphanumeric characters and when the input indicates a match, the software running on the mobile device sends a transaction to the authentication server indicating access to the third-party server is approved. After receiving the transaction indicating access to the third-party server is approved, the software running on the authentication server sends an access token to the third-party server and, responsive to receiving the access token by the software running on the third-party server, the third-party server grants access by the client device.

In another embodiment, a method for full-duplex authentication of a user of a third-party server without requiring a password from the user is disclosed. The user has a user-ID such as an email address. The method includes pre-registering the user of the full-duplex authentication by requesting access to the full-duplex authentication at the third-party server by the user, providing the user-ID. The third-party server forwarding the user-ID to an authentication server and the authentication server generating a registration code embedded in a QR code and sending the QR code to the client device where the QR code and the registration code are displayed. The QR code is then scanned by the mobile device and an authentication application is installed on the mobile device. The registration code is displayed at the mobile device and then entered (by the user) into the authentication screen on the display of the client device. Responsive to entering the registration code and approval by the authentication server, the authentication application generates a cryptographic key pair and sends a public key of the cryptographic key pair to the authentication server and the authentication server saves the public key for future communications. After pre-registering, when the user attempts to access the third-party server at the client device, the client device sends a request to access the third-party server to the third-party server, the request comprising the user-ID. The third-party server establishes a secure connection with the authentication server and the authentication server validates the third-party server (e.g., by way of a digital certificate). The third-party server sends an authentication request that includes the user-ID to the authentication server. The authentication server determines the mobile device of the user based upon the user-ID and generates a one-time password, generates a similar image and alphanumeric characters from the one-time password, and sends the similar image and alphanumeric characters to the third-party server and the third-party server forwards the similar image and alphanumeric characters to the client device where they are displayed. The authentication server also connects to the mobile device by way of a push notification server for a preliminary connection and then the authentication server connects to the mobile device through an encrypted channel. The authentication server sends the one-time password to the mobile device and the mobile device generates and displays an image and alphanumeric characters from the one-time password. The mobile device receives an input (from the user) indicative of a visual comparison of the image and alphanumeric characters displayed on the mobile device with the similar image and alphanumeric characters displayed on the client device and when the input indicates a match indicative that the request to access the third-party server is valid, the mobile device sends an authentication acknowledgment token to the authentication server and responsive to such, the authentication server sends a transaction to the third-party server, granting access of the third-party server by the client device.

BRIEF DESCRIPTION OF THE DRAWINGS

The invention can be best understood by those having ordinary skill in the art by reference to the following detailed description when considered in conjunction with the accompanying drawings in which:

FIG. 2 is a diagram of an authentication sequence of a user by the authentication server and the generation of the third-party server and mobile device one-time passwords in accordance with an embodiment of the full-duplex password-less authentication service.

FIG. 3 is a diagram of a successful authentication sequence of a user by the authentication server and interaction of the user with the mobile device, showing the access granted message displayed on the client device in accordance with an embodiment of the full-duplex password-less authentication service.

DETAILED DESCRIPTION

Figure 1:
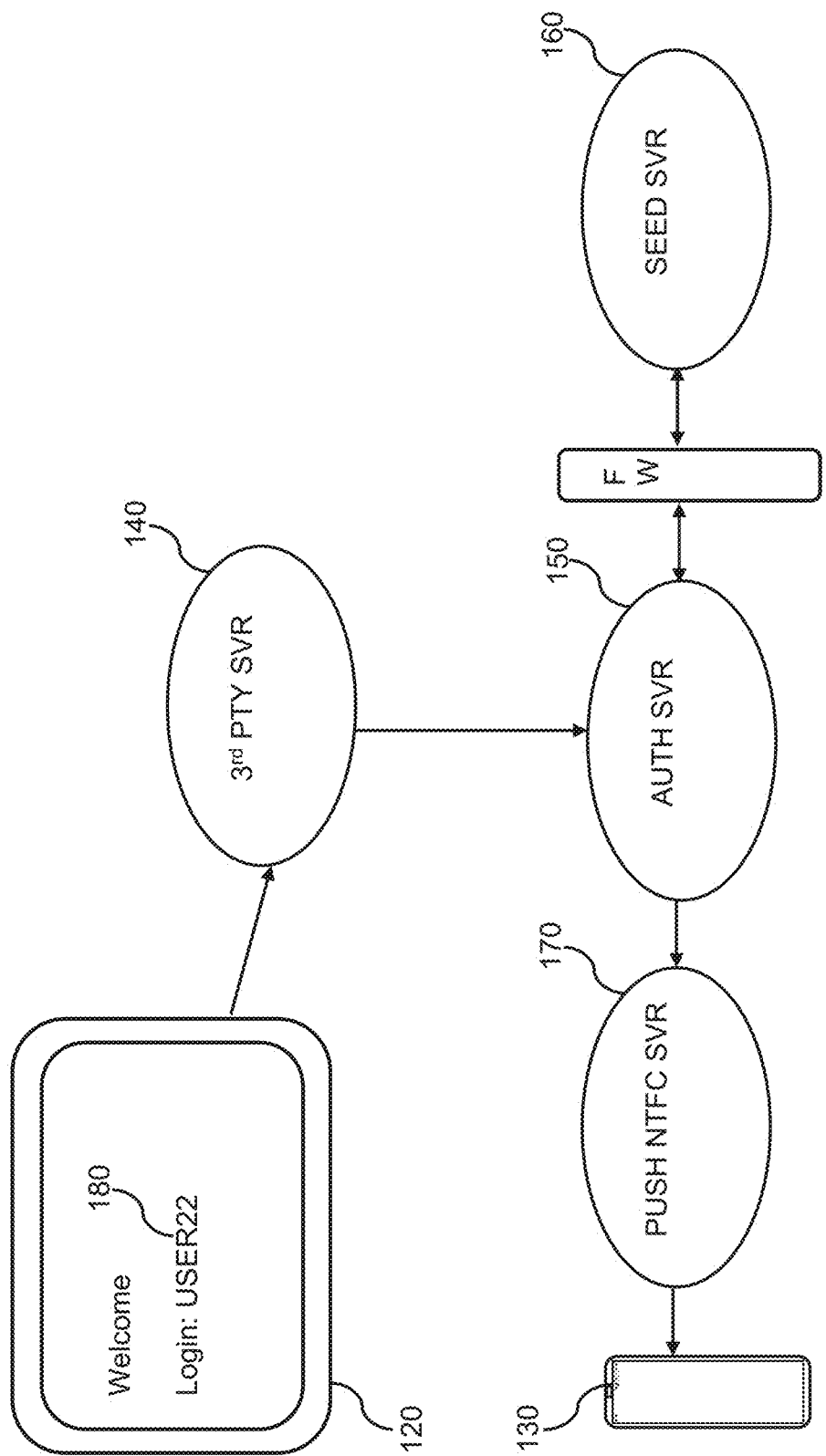
FIG. 1 is a diagram of an example of conducting full-duplex authentication of a user and a server without a password in accordance with an embodiment of the full-duplex password-less authentication service.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a diagram of an exemplary implementation of the full-duplex password-less authentication service is described. As shown in FIG. 1 the user looks to gain password-less access to the services (e.g. a website, a private network, a payment processing system) provided by a third-party server 140. Often, such services are known as portals or web portals as the third-party server is able to host one or many such portals. The user has access to a mobile device 130 and uses a client device 120 to access the portal on the third-party server 140. The user inputs a user ID 180 (or another user identifier or username) into the client device 120, and the client device 120 transmits the User ID 180 (e.g., username of "USER22") to the third-party server 140. The third-party server 140 provides the User ID 180 (e.g., username of "USER22") to the authentication server 150. The authentication server 150 then determines an associated mobile device 130 of the user (e.g. a mobile device 130 that is associated with the User ID 180 (e.g., username of "USER22"). In some embodiments, the authentication server 150 determines the associated mobile device 130 of the user by way of a seed that was previously generated and saved during the pre-registration process (see FIG. 8 and description). In some embodiments, the seed is retrieved from a seed server 160 while in other embodiments, the seed is retrieved from a secure database on any server, including the authentication server 150 or another server associated with the authentication server 150. Once the mobile device 130 is identified by the authentication server 150, an access request is sent to the push notification server 170. The access request is forwarded from the push notification server 170 to the mobile device 130 associated with the user for verification.

Figure 2:
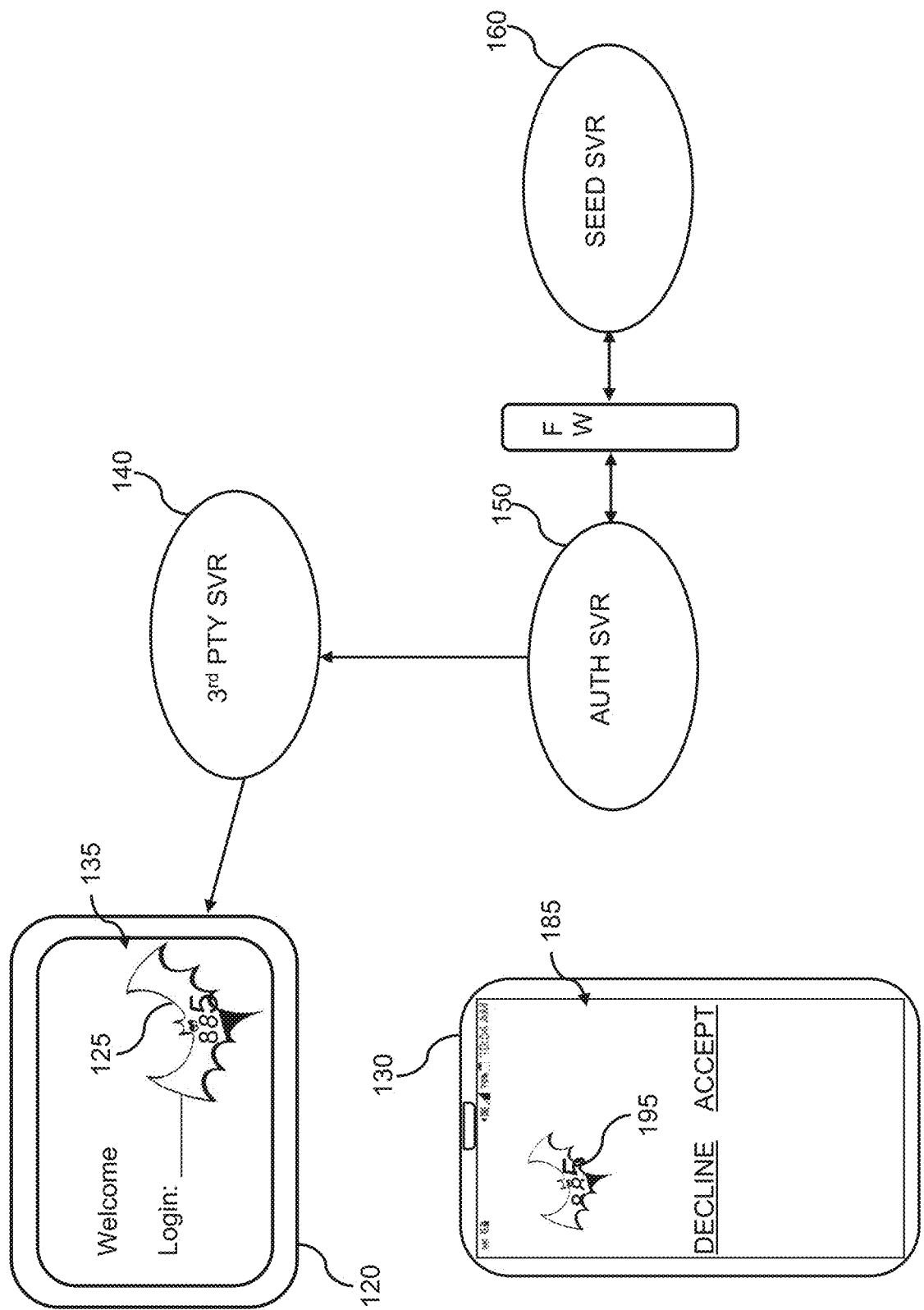
FIGS. 2 and 3 are diagrams of an exemplary implementation of the full-duplex password-less authentication service.

Referring to FIG. 2, a second diagram of an exemplary implementation of the full-duplex password-less authentication service is described. After the access request from the authentication server 150 is received at the mobile device 130. The mobile device 130 will display an access request 185 for the user. The access request 185 indicates that an access request was made from a client device 120 with a certain Internet Protocol (IP) address using the User ID 180 of the user that was previously associated with the mobile device 130. The access request 185 displayed at the mobile device 130 will include an image+alphanumeric characters 195 that are generated at the mobile device 130 using information received from the authentication server 150 (one-time password) and data previously stored at the mobile device 130. After the authentication server 150 verifies the third-party server 140, the authentication server 150 generates a similar image+alphanumeric characters 125 and transmit the similar image+alphanumeric characters 125 to the third-party server 140 where the similar image+alphanumeric characters 125 is displayed in an access message 135 on the client device 120. The user will compare the two messages and then interact with the mobile device 130 to accept or deny of the request made of the access message 135 to allow access the services of the third-party server 140 (accept) or, if the image+alphanumeric characters 195 is different from the similar image+alphanumeric characters 125 or if the user did not make the attempt to access the third-party server 140, to refuse (decline) in which case, access to the portal on the third-party server 140 is not provided by the third-party server 140.

Figure 3:
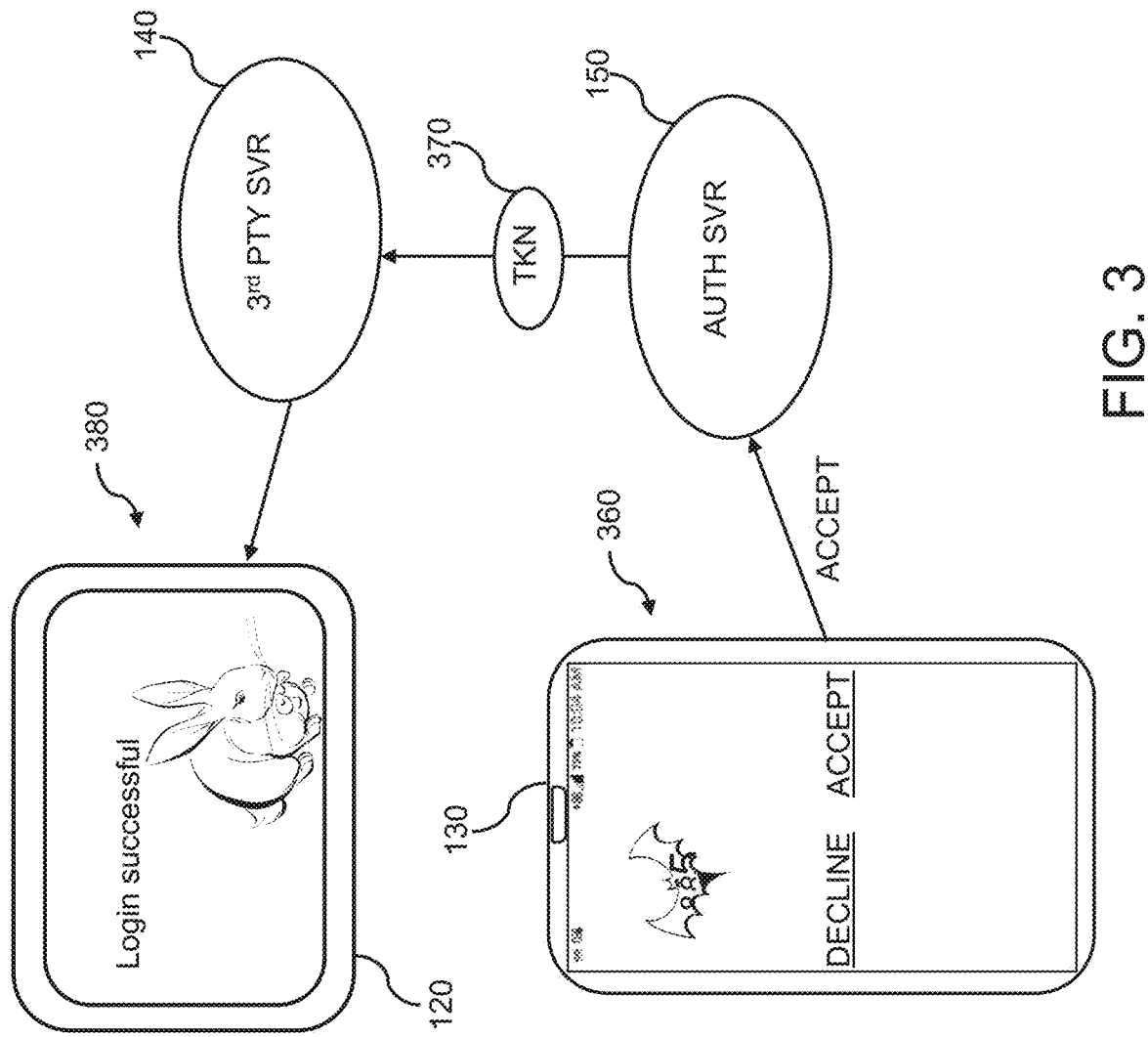

Referring to FIG. 3, a third diagram of an exemplary implementation of the full-duplex password-less authentication service is described. Assuming the user interacts with the mobile device 130 to allow access (accept) to the third-party server 140 and the associated portal (services), the mobile device 130 sends the authentication server 150 an indication that the access request has been approved. The authentication server 150, after verifying the legitimacy of the approval, generates an access token 370 and transmits the access token 370 to the third-party server 140. The third-party server 140 uses the access token 370 to grant access to the third-party server 140 by the client device 120 (e.g. login was successful 380) after which, the allowed services/portals that are covered by in the access token 370 are available to the user at the client device 120.

Figure 4:
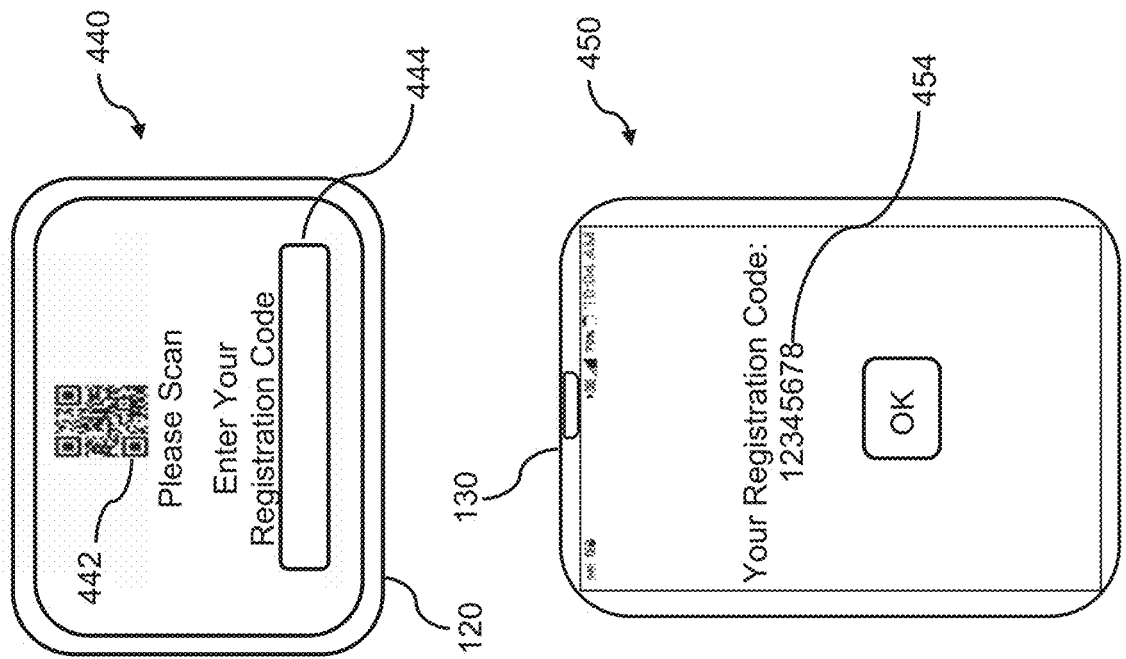
FIG. 4 is a diagram of the pre-registration process in accordance with an embodiment of the full-duplex password-less authentication service.

Referring to FIG. 4, a fourth diagram of an exemplary implementation of the full-duplex password-less authentication service is shown. FIG. 4 shows an example of registering a user for the full-duplex password-less authentication service. The user initiates registration from the client device 120. After requesting registration, the authentication server 150 sends/displays a pre-registration message 440 that is displayed by the client device 120 for the user. The pre-registration form 440 will contain a QR 442 code that, when scanned by the mobile device 130, will direct the mobile device 130 to the installation of the password-less full-duplex authentication application corresponding to the operating system used by the mobile device 130. The QR contains an embedded one-time registration code, that is extracted after the user scans the QR code with the mobile device 130. After the user has installed the password-less full-duplex authentication application on the mobile device 130, the one-time registration code 454 (e.g. "12345678") is shown in a registration message 450 on the mobile device 130. The user interacts with the client device 130 and enters the one-time registration code 454 that is now displayed on the mobile device 130 into a registration code entry field 444 that is displayed in the pre-registration form 440 at the client device 120. The entered one-time registration code 444 is then sent from the client device 120 to the authentication server 150 where testing is performed by the authentication server 150 to make sure that the entered registration code 444 entered at the client device 130 matches the preregistration code 454 that was embedded into the QR code in the pre-registration message 440 and displayed on the mobile device 130, and if successful, the mobile device 130 is associated with the client device 120 and user ID 180.

Figure 5:
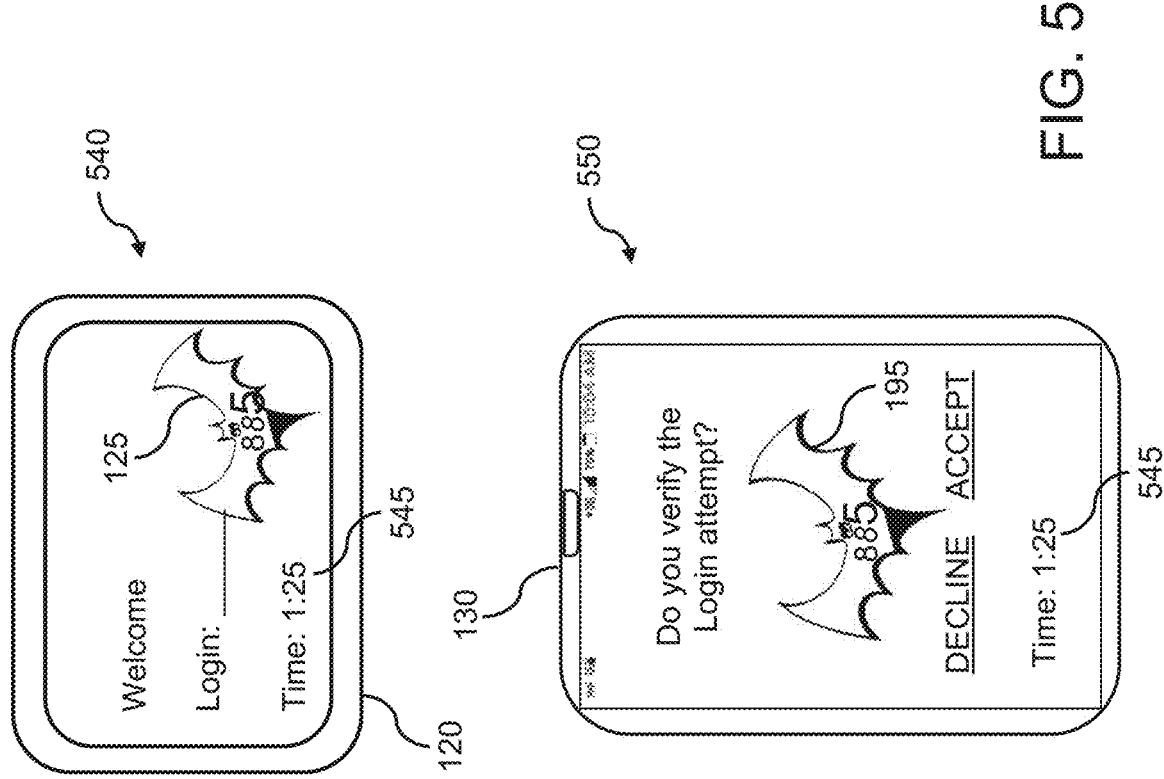
FIG. 5 is a diagram of an authentication sequence of the user by the authentication server and the generation of the third-party server and mobile device one-time passwords in accordance with an embodiment of the full-duplex password-less authentication service.

Referring to FIG. 5, a fifth diagram of an exemplary implementation relating to the processes of the full-duplex password-less authentication service is described. FIG. 5 shows an example of the password-less full-duplex authentication login scenario. The user has access to the client device 120 and the mobile device 130. The user requests to access services (e.g., a portal) provided by the third-party server 140. A login message 540 from the authentication server 150 is displayed on the client device 120. The login message contains the One-Time-Password (e.g. the similar image+alphanumeric characters 125), for example, three characters or numbers are shown as an example. The combination of image and code comprising numbers/characters improves the user's ability to compare what is viewed at the client device 120 and what is viewed at the mobile device 130.

In some embodiments, the One-Time-Password is valid for a fixed period of time and, in such, a time counter 545 is displayed in the login message 540 that indicates the remaining time (e.g. number of minutes and/or seconds) that this One-Time-Password is valid. In such, after the time counter 545 reaches zero, the One-Time-Password will be invalidated and/or will change to a new One-Time-Password. The mobile device 130 displays a one-time-password message 550. The one-time-password message 550 includes the image+alphanumeric characters 195. In some embodiments, the One-Time-Password is valid for a fixed period of time and, in such, a time counter 545A is displayed in the one-time-password message 550 that indicates the remaining time (e.g. number of minutes and/or seconds) that this One-Time-Password is valid. In such, in some embodiments, the time counter 545 is also displayed in the login message 540. The user has options in the One-Time-Password message 550 that is displayed on the mobile device 130 to accept or decline access. The user will visually compare the similar image+alphanumeric characters 125 of the login message 540 with the image+alphanumeric characters 195 of the one-time-password message 550 and decides to accept or decline based on the sameness of the similar image+alphanumeric characters 125 compared to the image+alphanumeric characters 195.

Figure 6:
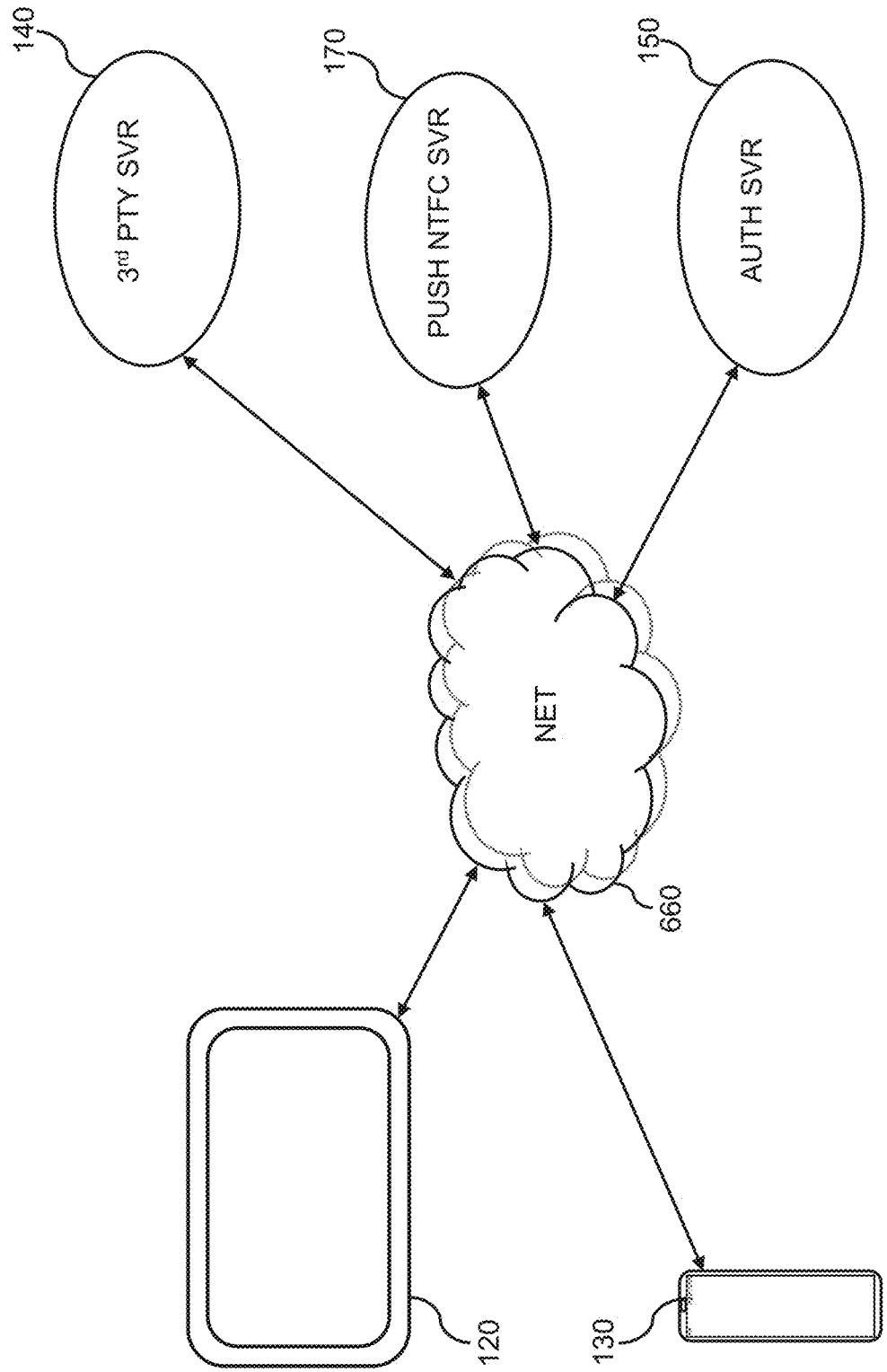
FIG. 6 is a diagram of one example environment in which systems and/or methods described herein are implemented.

Referring to FIG. 6, a sixth diagram of an example environment in which systems and/or methods of the full-duplex password-less authentication service operate is shown. As shown in FIG. 6 exemplary environment includes a client device 120, a mobile device 130, a third-party server 140, a push notification server 170, an authentication server 150 and a network 660. As discussed above, the client device 120 and mobile device 130 are associated with the same user. Any network connections between the client device 120, the mobile device 130, the third-party server 140, the push notification server 170, and the authentication server 150 are anticipated, including, but not limited to, any combination of wired connections, cellular connections, and wireless connections. The mobile device 130 is anticipated to include one or more devices capable of receiving, generating, storing, processing, and/or providing information associated with a full-duplex password-less authentication service (e.g., registration information, encrypted information, an access notification, user preferences, and/or other information described herein). For example, in some embodiments, the mobile device 130 is a mobile phone (e.g., a smart phone, a smart watch, etc.), a tablet computer, a handheld computer, a personal digital assistant, or a similar device. The mobile device 130 is registered for the full duplex password-less authentication service provided by the authentication server 150 as described above. The mobile device 130 is authenticated and registered by the authentication server 150 (e.g., sharing public key cryptography, a digital certificate) as described above. When a user who is associated with the mobile device 130 uses the client device 120 to attempt an access to a service provided via a third-party server 140, the above described authorization takes place. The authentication server 150 is anticipated to include one or more processing elements capable of receiving, generating, storing, processing, and/or providing information associated with a full-duplex password-less authentication service, and/or capable of authenticating a user and/or a device for the third-party server 140 using the authentication service, and/or capable of authenticating the third-party server 140 and/or a device for the user using the full-duplex password-less authentication service. For example, in some embodiments, the authentication server 150 includes a computing device, such as a server (e.g., an authentication server, a firewall), a desktop computer, a laptop computer, a tablet computer, a handheld computer, or a similar device. The authentication server 150 is anticipated to register the mobile device 130 that is associated with the user for later authentication using the full-duplex password-less authentication service. Additionally, or alternatively, the authentication server 150 is anticipated to register one or more third-party servers 140 (or portals on a third-party server 140) for the full-duplex password-less authentication service. In some embodiments, the authentication server 150 will register itself with the push notification server 170 in order to transmit an access request message via the push notification server 170 to the mobile device 130. The mobile device 130 is registered with the push notification server 170 in order to receive the access request message sent from the authentication server 150 via the push notification server 170. The authentication server 150 is configured to authenticate the user of the client device 120 that is attempting to access a service of the third-party server 140 by way of the mobile device 130, when the client device 120 attempts to access a service provided via the third-party server 140. In some embodiments, the client device 120 includes subsystems capable of receiving, generating, storing, processing, and/or providing information associated with the full-duplex password-less authentication service. In some implementations, the client device 120 includes one or more subsystems used to provide access to a third-party service. For example, the client device 120 includes a computing device, such as a desktop computer, a laptop computer, a tablet computer, a handheld computer, a phone (e.g., a mobile phone, a smart phone, a radiotelephone, etc.), or a similar device. A user, associated with mobile device 130, uses the client device 120 to attempt to access a third-party service, provided by third-party server 140 using the full-duplex password-less authentication service. The third-party server 140 requests that the authentication server 150 authenticate the user using the full-duplex password-less authentication service, and receive an indication that the user has been authenticated. The authentication server 150 sends the request via the push notification server 170 to the mobile device 130 and the authentication server 150 validates the user via the mobile device 130 and validates the authenticity of the third-party server 140. In some embodiments, the third-party server 140 includes one or more devices capable of receiving, generating, storing processing, and/or providing information associated with a third-party service and/or the full-duplex password-less authentication service. For example, the third-party server 140 includes a computing device, such as a server (e.g., a content server, a web server, a host server, a database server, a credit card processing server, etc.), or a similar device. Third-party server 140 provides one or more third-party services. When a user uses client device 120 to attempts to access a third-party service provided by the third-party server 140, the third-party server 140 contacts the authentication server 150, requesting that the user be authenticated. The authentication server 150 uses information received form the third-party server 140, to address the mobile device 130. The authentication server 150 communicates with the mobile device 130 via the push notification server 170 and later authenticates the mobile device 130 using techniques described herein, verifying the identity of the third-party server 140 to the user and verifying the identity of the user to the third-party server 140. After this verification, the third-party server 140 then permits the client device 120 to access services provided by the third-party server 140.

The network 660 is anticipated to include one or more wired and/or wireless networks. For example, a cellular network (e.g., CMDA, TDMA), a long term evolution (LTE) network, a local area network (LAN), a wide area network (WAN), a metropolitan area network (MAN), a near field communication (NFC) network, an ad hoc network, an intranet, the Internet, a fiber optic-based network, a cloud computing network and/or a combination of these and/or other types of networks. The number of devices and networks shown are provided as an example. In practice, additional devices and/or networks are anticipated, fewer devices and/or networks, different devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (one or more devices) may perform one or more functions described as being performed by another set of devices.

Figure 7:
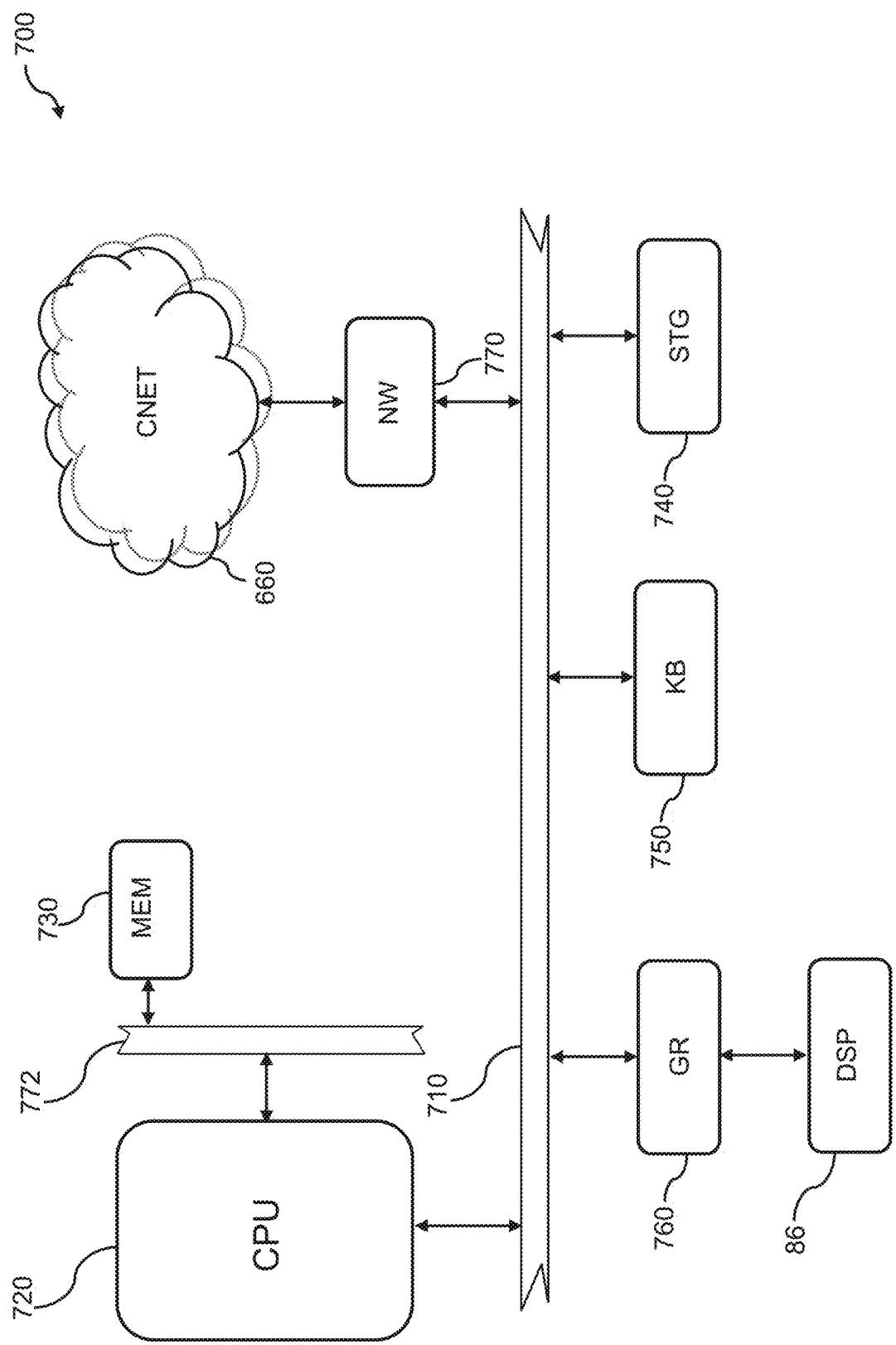
FIG. 7 is a diagram of exemplary components of one or more devices of FIG. 6.

Referring to FIG. 7, a diagram of exemplary components of a device/computer/server is shown. The device 700 is anticipated to correspond to any device used as examples here within such as: the mobile device 130, the authentication server 150, the client device 120, and/or the third-party server 140. As shown in FIG. 7, the device 700 includes a bus 710, a processor 720, a memory 730 interfaced to the processor by a memory bus 772, a storage component 740, an input component 750, an output component 760, and a communication interface 770.

Bus 710 includes components that permit communication between the processor 720 and other components of device 700. The memory 730 may is any type and quantity of a random-access memory (RAM), a read only memory (ROM), and/or another type of dynamic or static storage (e.g., flash memory, optical memory) that stores information and/or instructions for use by the processor 720.

Storage component 740 stores information and/or software related to the operation and use of device 700 in a non-transitory way. For example, the storage component 740 includes a hard disk (flash memory, a magnetic memory, an optical memory, etc.), a compact disc (CD), a digital versatile disc (DVD), a floppy disc, a cartridge, a magnetic tape, and/or another type of computer-readable medium, along with a corresponding drive.

Input component 750 includes any component that permits the device 700 to receive information, such as user input (e.g., a touch screen display, a keyboard, a keypad, a mouse, a button, a switch, a microphone, etc.). Additionally, or alternatively, the input component 750 includes a sensor for sensing information (e.g., a global positioning system or GPS component, an accelerometer, a gyroscope, etc.). The output component 760 includes, for example, a component that provides output information from the device 700 (e.g., a display, a speaker, one or more light-emitting diodes (LEDs)).

The communication interface 770 includes, for example, a transceiver (e.g., a transceiver, a separate receiver and transmitter, etc.) that provides communications services for the device 700 to communicate with other devices, such as via a wired connection, a wireless connection, or a combination of wired and wireless connections. The communication interface 770 allows the device 700 to receive information from other devices and/or provide information to other devices. For example, in some embodiments, the communication interface 770 includes an Ethernet interface, a coaxial interface, an infrared interface, a radio frequency (RF) interface, a universal serial bus (USB) interface, a Wi-Fi interface, a cellular network interface, or the like.

The device 700 executes processes of the present invention in response to the processor 720 executing software instructions stored by a computer-readable medium, such as the memory 730 and/or the storage component 740. Such computer-readable medium is a non-transitory memory device. Such memory devices include memory space within a single physical storage device or memory space spread across multiple physical storage devices.

Software instructions are typically read into the memory 730 from the storage component 740 or from another computer-readable medium or from another device via the communication interface 770. When executed, software instructions stored in the memory 730 cause the processor 720 to perform one or more processes described herein.

Additionally, or alternatively, hardwire circuitry may be used in place of or in combination with software instructions to perform one or more processes described herein. Thus, implementations described herein are not limited to any specific combination of hardware circuitry and software.

The sub-components of the device 700 shown in FIG. 7 are provided as an example. In practice, it is anticipated that the device 700 includes additional components, fewer components, different components, or differently arranged components than those shown in FIG. 7. Additionally, or alternatively, in some embodiments, a set of components of the device 700 performs one or more function described as being performed by another set of components of the device 700.

Figure 8:
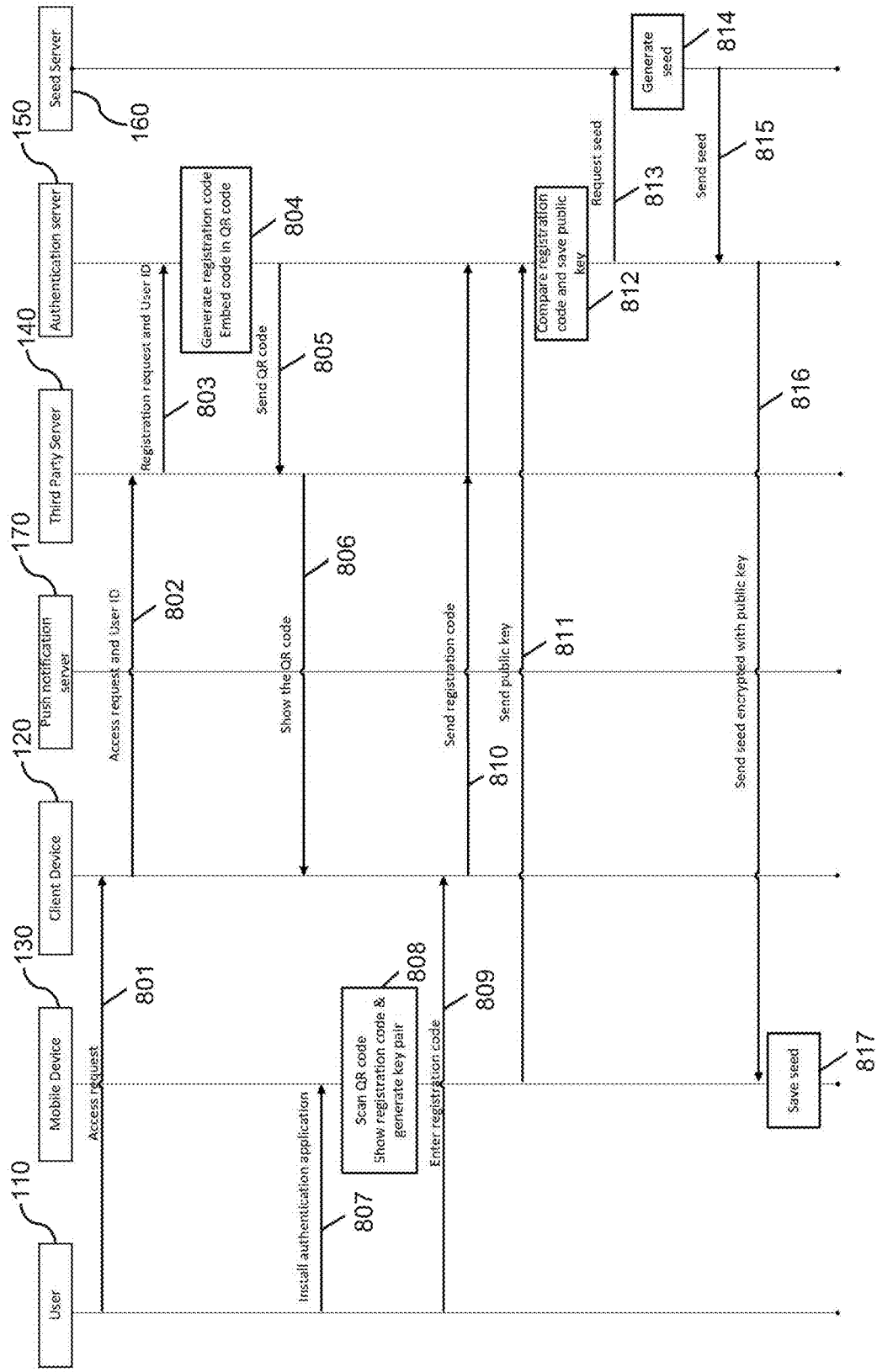
FIG. 8 is a flow diagram of the different steps of the registration of a user on the authentication server one-time passwords in accordance with an embodiment of the full-duplex password-less authentication service.

Referring to FIG. 8, a user registration process according to an embodiment of the described embodiment of FIG. 4 is shown. A user inputs to a client device 120 the User ID 180 or/and any user credentials that were previously used to authenticate the user to the third-party server using legacy authentication (e.g. User ID 180 and password). After the user is authenticated using the legacy authentication of the third-party, the user requests 801 to be registered for full-duplex password-less authentication service using the authentication server 150 so that the user will have the ability to take advantage of the full-duplex password-less authentication method during future login attempts. The user requests to be registered to take advantage of the disclosed full-duplex password-less authentication method along with the User ID 180 or/and any other user identification. This request is sent 802 to the third-party server 140 from the client device 120. The third-party server 140 sends 803 the request including the user identification (user ID 180) to the authentication server 150. The authentication server 150 receives the user ID 180 and the registration request from the third-party server 140. The authentication server 150 checks the authenticity of the third-party server 140 by checking the server's digital certificates and, in some embodiments, checks that the third-party server 140 is given permission to use the service of authentication server 150. After these steps, the authentication server 150 will generate 804 a one-time registration code for the user. The one-time registration code is embedded in a QR code (or any known encoding scheme) along with the user information and the portal of the third-party server 140 that has requested this registration. The authentication server 150 transmits 805 the one-time registration code embedded in a QR code along with the installation guide (e.g. installation link) to the third-party server 140, and the third-party server 140 sends 806 the QR code along with the installation guide (e.g. installation link) to the client device 120. The client device 120 displays the QR code 804 on a display 86.

The user installs 807 the full-duplex password-less authentication service mobile application on the mobile device 130 (e.g. by scanning the QR code 804). After the user has installed the full-duplex password-less authentication service mobile application on the mobile device 130, the user scans 808 the QR code and the application extracts and displays the one-time registration code. The full-duplex password-less authentication service mobile application generates a cryptographic key pair for encrypting messages sent between the mobile device 130 and the authentication server 150. The user enters 809 the one-time registration code displayed on the mobile device into the user client device, and from there it is forwarded 810 to the third-party server and then to the authentication server for comparison and verification. The mobile device 130 initiates 811 a secure connection between the mobile device 130 and the authentication server 150 and transmits the one-time registration code along with the public key of the generated cryptographic key pair. The authentication server 150 receives the one-time registration code and compares 812 the one-time registration code with the one-time registration code previously sent to the third-party server 140 and if there is not a match, the registration is aborted. If there is a match, the authentication server 150 saves 812 the user's information transmitted from the client device 120 along with the public key sent from the mobile device 130. The authentication server 150 requests 813 the seed server 160 generate 814 a unique seed for the User ID 180. The unique seed will later be used as an authentication token that will be associated to the specific user. The unique user seed is generated 814 and sent 815 to the authentication server 150. The authentication server 150 sends 816 the unique user seed to the mobile device 130, encrypted using the public key that was generated by the mobile device 130. The mobile device 130 saves 817 decrypts the unique user seed and stores the unique user seed on the mobile device 130. Additionally, or alternatively, the registration success or failure is forwarded to third-party server 140 and displayed to the user on a display 86 the client device 120.

Figure 9:
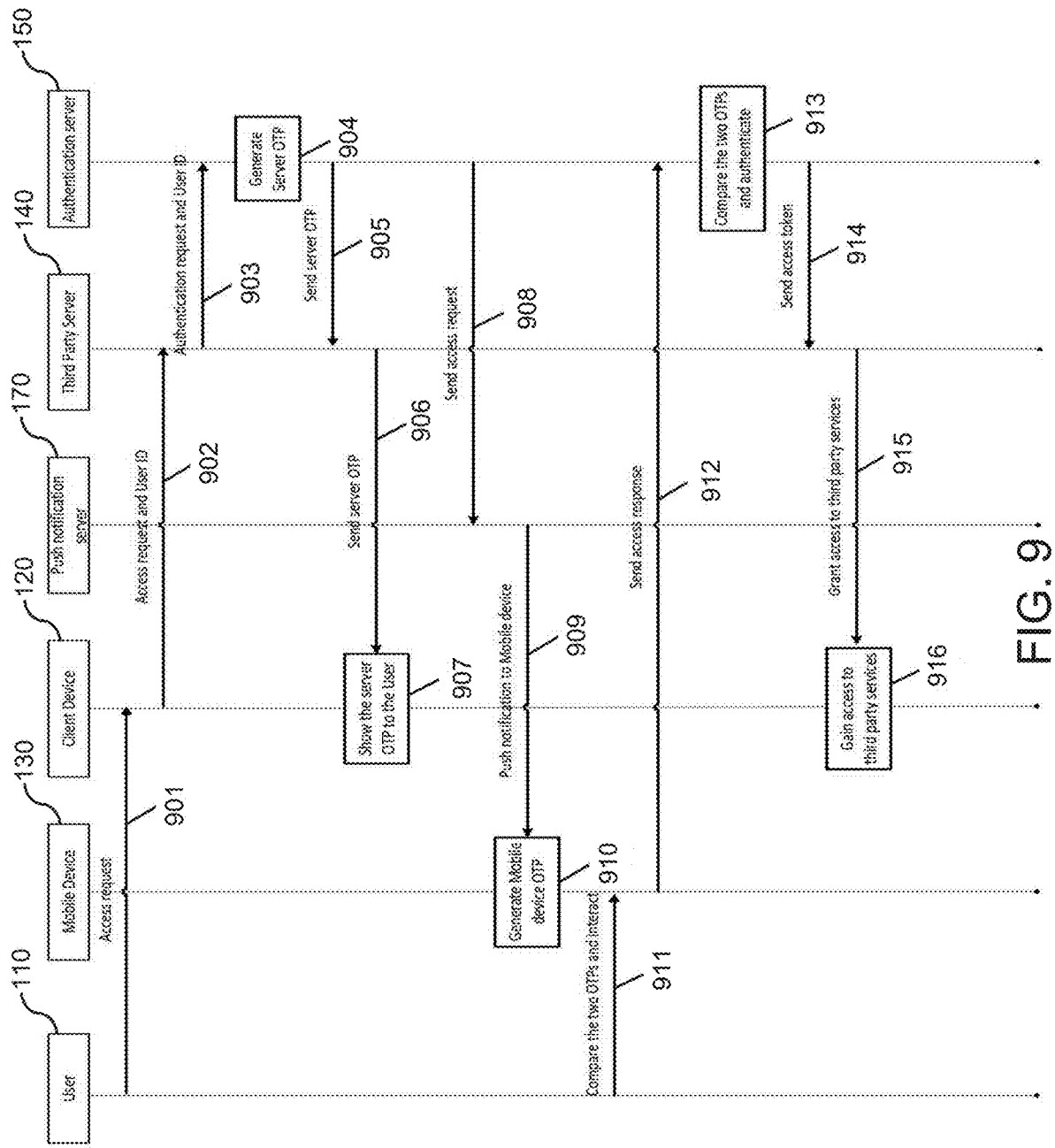
FIG. 9 is a flow diagram of the different steps of the authentication of a user by the authentication server one-time passwords in accordance with an embodiment of the full-duplex password-less authentication service.

Referring to FIG. 9, a user authentication process according to one embodiment of the full-duplex password-less authentication system is shown. A user accessing a portal hosted by the third-party server 140 inputs 901 the User ID 180 and any other user identification that is known to the authentication server 150 into the client device 120, thereby requesting use of the full-duplex password-less authentication system. The access request along with the user ID 180 is transmitted 902 to the third-party server 140 from the client device 120. The third-party server 140 transmits 903 the request and user ID 180 to the authentication server 150. The authentication server 150 receives the access request and fetches the unique user seed 812 that corresponds to the user ID 180, and the authentication server 150 generates 904 a one-time password using the unique seed and optionally other information-received form the third-party server 140. The authentication server 150 sends 905 a server one-time password to the third-party server as the similar image+alphanumeric characters 125. The third-party server 140 sends 906 the server one-time password to the client device 120 and the client device 120 displays the server one-time password as the similar image+alphanumeric characters 125 as shown in FIG. 2.

The authentication server also sends 908 an access request to the push notification server 170 which forwards the access request to the mobile device 130. The access request is used by the application running on the mobile device 130 to generate and show 910 the one-time password as the image+alphanumeric characters 195 as shown in FIG. 2. The information is processed, both at the mobile device 130 and at the authentication server 150, using a hash algorithm to generate the image+alphanumeric characters 195 and the similar image+alphanumeric characters 125. In a preferred embodiment, the hash algorithm is a Hashed One-Time Password. For example, the output of the hash algorithm is a seven-digit numeric value which is truncated or converted into a six-digit base-10 numeric value. The first three digits select an image from a database of 1000 (0-999) images (the same database is at the mobile device 130 and at the authentication server 150) and the last three digits are displayed over the image, as for example the similar image+alphanumeric characters 125 of FIG. 2, the image being that of a bat and the three digit numeric value being 885. This representation is much easier for a human to compare (instead of the one-time password or the eight-digit or six-digit hash value) as it has a short (three digit) number and a single image/picture. Note that although in this description, the hash value is forced to be seven decimal digits (e.g. using modulus 10,000,000) converted to six-digits, three of the digits used to index the image and three displayed over the image, there is no limitation as to the hash value, number of digits displayed, and/or the number of unique images. For example, it is easier for a computer to work in octal or hexadecimal and, therefore, it is conceivable that the hash value be a hexadecimal value that is masked and shifted with, for example, 0x1FF, then converted to decimal to get a three digit number from 0 to 511, and shifted to the right 9 places and masked with 0x3FF to get a number between 0 and 1023 to index into an array of 1024 images. All possible combinations of arrays of images sizes and digits displayed over (or around) the images are anticipated, including the use of color to differentiate the images (e.g. a green bat is different than a purple bat). In the latter, as an example, the first two bits of the hash value (before shifting) is used to define the color (e.g. one of four colors) and the last 7 bits are used to index into an array of 128 images, so each image can be colored any one of four colors.

The mobile device 130 generates the mobile one-time password using the unique user seed 812 that was stored on the mobile device 130 during the registration process and the access request from the authentication server 150. The one-time password is displayed as the image+alphanumeric characters 195 on a display 86 of the mobile device 130 for the user to see. The user interacts 911 with the mobile device 130 after visually comparing the similar image+alphanumeric characters 125 that is displayed at the client device 120 and the image+alphanumeric characters 195 that is displayed at the mobile device 130 and if the two are the same, acknowledges the sameness of the one-time passwords and the desire to login to the third-party server 140 to use the third-party services. The response (e.g. accept or decline) from the user entered into the mobile device 130 (e.g. by keyboard, touch, or voice input) is then transmitted 912 to the authentication server 150 via a secure connection. Once the authentication server 150 receives the response from the mobile device 130 and if the response from the mobile device 130 is "accept," the authentication server 150 then decides to grant access to the user. If the response from the mobile device 130 is not "accept," the authentication server 150 denies access to the user. In some embodiments, a random challenge is made to assure validity of that the mobile device 130 that is accepting the authentication. If the user is authenticated by the authentication server 150, an authentication token is issued and sent 914 to the third-party server 140. Responsive to the third-party server 140 receiving the authentication token from the authentication server 150, the third-party server 140 grants permission 915 to the user to access the requested portal on third-party services to which permission was granted. A message (allowed or denied access) is displayed on a display 86 of the client device 120 for the user.

Figure 10:
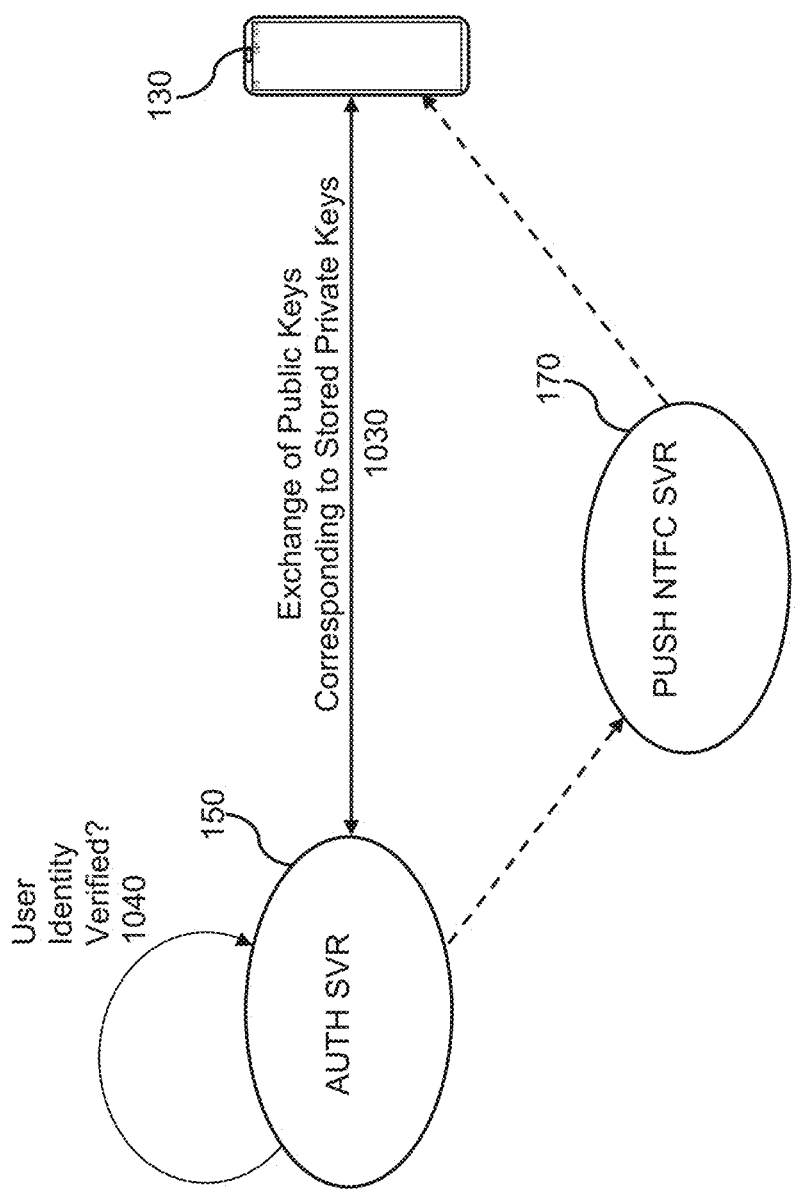
FIG. 10 is a diagram of the various connections between the authentication server and the mobile device and the cryptographic key exchanges between them that provides secure access in accordance with an embodiment of the full-duplex password-less authentication service.

Referring to FIG. 10, a diagram of an exemplary implementation of the full-duplex password-less authentication service is described, illustrating the connection between the authentication server 150, the mobile device 130 and the push notification server 170 and the different cryptographic keys and encryption methods used between these devices to communicate safely and, consequently, verify the identity of the user. During the registration of the user, a set of keys are generated and stored on the respective device (authentication server 150 and mobile device 130). A secure connection is initiated between the mobile device 130 and the authentication server 150, for example, using Transport Layer Security (TLS) that provides end-to-end communications security over networks. The secure connection (e.g. using Transport Layer Security) starts with a handshake between the mobile device 130 and the authentication server 150. The authentication server 150 first acts as the client and afterwards takes on the server role during establishment of this secure connection; both the authentication server 150 and the mobile device 130 will share their respective cryptographic public keys 1030 between each other. Additionally, a set of cryptographic keys are generated on the mobile device 130 using, for example, the RSA 2048 algorithm. The set of cryptographic keys are used to additionally encrypt the messages between the mobile device 130 and the authentication server 150. The set of cryptographic keys (private+public) are generated during the registration sequence and the public key is sent to the authentication server 150. As mentioned, the secure connection between the mobile device 130 and the authentication server 150 (e.g. over Transport Layer Security), the same applies to the secure connection between the authentication server 150 and the push notification server 170. Additionally, a second pair of cryptographic keys are generated by the authentication server 150 using, for example, the ECDSA algorithm over the 256 curve and the second pair of cryptographic keys (private+public) are used for signing messages by the authentication server 150 that are sent to the push notification server 170. The public key of the second pair of cryptographic keys is sent and stored on the push notification server 170 and this public key is used to verify the messages signed by the private key of the second pair of cryptographic keys that was generated and stored on the authentication server 150.

Figure 11:
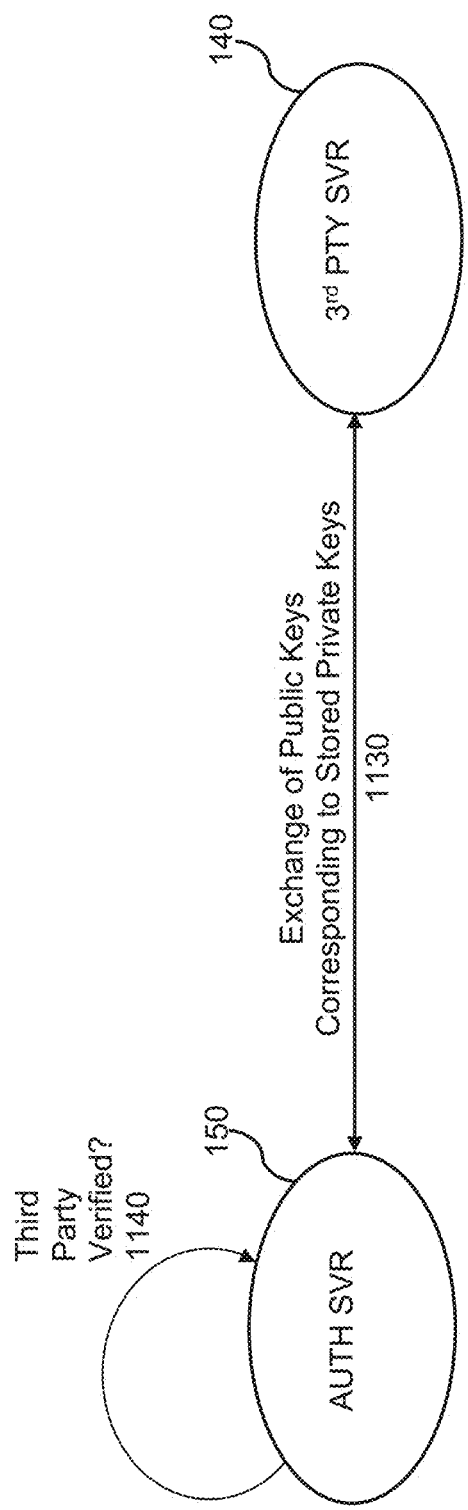
FIG. 11 is a diagram of the various connections between the authentication server and the third-party server and the various cryptographic key exchanges between such in accordance with an embodiment of the full-duplex password-less authentication service.

Referring to FIG. 11, a diagram of an exemplary implementation of the full-duplex password-less authentication service is described, illustrating the connection between the authentication server 150 and the third-party server 140, including the different cryptographic keys and encryption methods used to communicate safely and consequently the verification of the third-party server 140. During the registration of the third-party services by the third-party server 140 to use the service of the full-duplex password-less authentication, a secure connection is established between the authentication server 150 and the third-party server 140 (e/g/using Transport Layer Security), with the third-party server 140 initially acting as the client side and requesting the authentication server 150 to be the client. In this, the authentication server 150 forwards to the third-party server 140 its required cipher suit 1130 that consists of cipher suits present in, for example, TLS versions 1.2 and TLS 1.3. In other words, the third-party server 140 request a secure connection to the authentication server 150. In this request, the third-party server 140 discovers the methods of encryption and hashing supported by the authentication server 150 and the authentication server responds with a prioritized list of encryption methods and hashing algorithms. The third-party server 140 and authentication server 150 then agree on an encryption method and hashing algorithm and, thereafter, messages exchanged between the third-party server 140 and the authentication server 150 are encrypted and hashed based upon the agree upon encryption method and hashing algorithm for the duration of the connection.

The authentication server 150 does not communicate with third-party servers 140 that do not meet these requirements. During this connection, a pair of private and public keys is generated on both the authentication server 150 and the third-party server 140. The respective public key of each is shared with the other for future encryption. Moreover, both the authentication server 150 and the third-party server 140 will share their respective certificates that they have acquired from a valid certificate authority (CA), and those certificates are checked for authenticity by each of the authentication server 150 and the third-party server 140. After these steps have been successfully passed, the administrator that has access to the third-party server's 140 must enter a code that was given to him by the ownership of the authentication server 150 and the code is verified by the authentication server 150 triggering a request to verify the registration that is sent to the third-party server 140 backend that can only be interacted with by the administrator of the third-party server 140.

Figure 12:
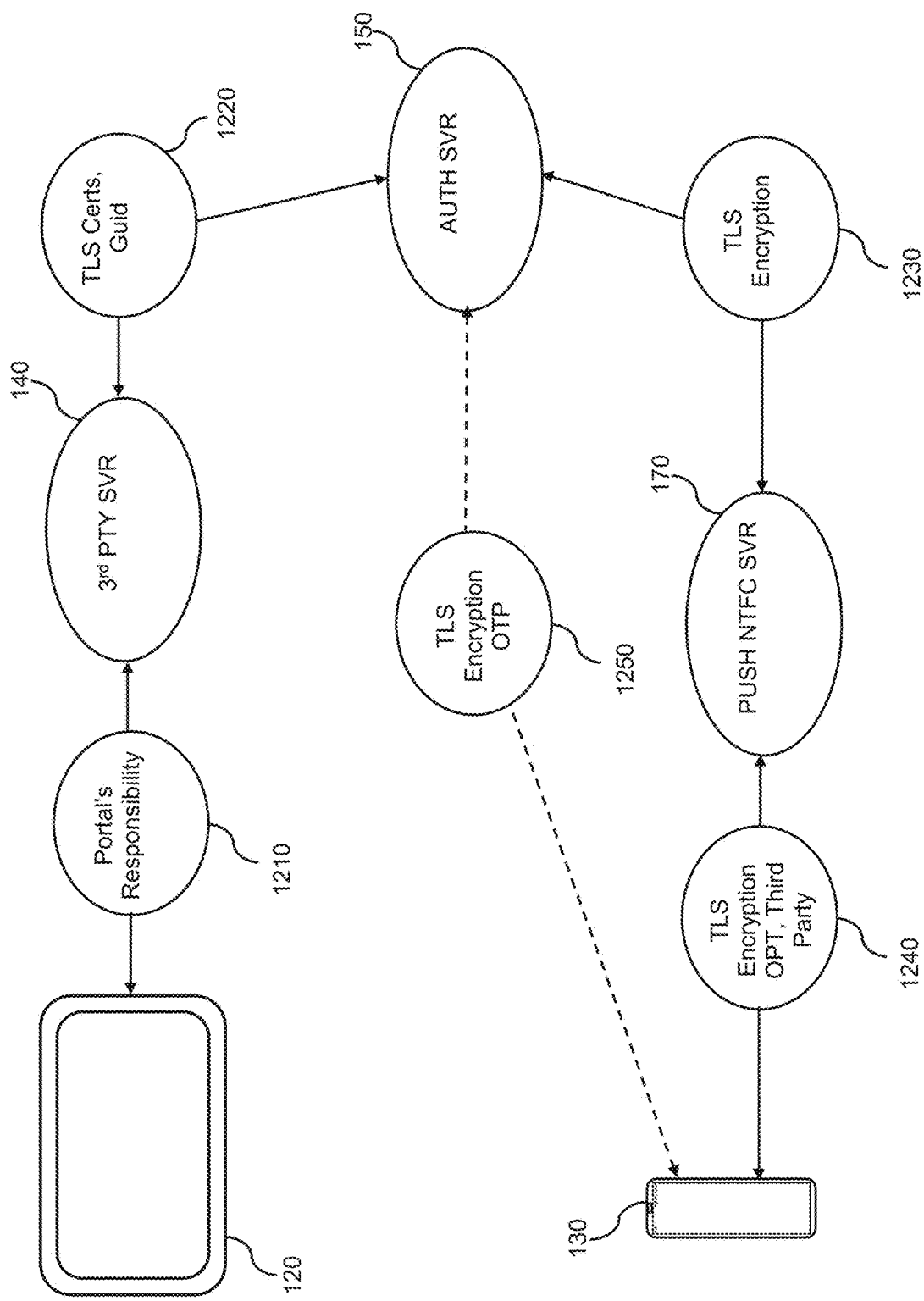
FIG. 12 is a diagram that shows all the various connections vulnerable to the man-in-the-middle attack and how such connections are protected from such an attack in accordance with an embodiment of the full-duplex password-less authentication service.

Referring to FIG. 12, a diagram of an exemplary implementation of the full-duplex password-less authentication service is shown illustrating the different connections between the different parties. This implementation illustrates possible locations between the different parties that a man-in-the-middle attack is anticipated to be possible and respectively with which method or methods prevent such attacks. There is one possible opportunity for a man-in-the-middle attack 1210 in the communications between the client device 120 and the third-party server 140. The security of the communication channel between the client device 120 and the third-party server 140 relies upon the client device 120 as such is outside of the scope of the full-duplex password-less authentication system. Another opportunity for a man-in-the-middle attack 1220 is the connection between the third-party server 140 and the authentication server 150. To prevent an intrusion by a third-party into this connection both the third-party server 140 and the authentication server 150 share and verify each other's certificates that where achieved from an authorized certification authority (CA) as mentioned in implementation. A secure connection is established between the third-party server 140 and the authentication server 150 (e.g. using TLS) that results in the generation of separate public and private keys on both sides of the connection that will be used to encrypt and decrypt all future messages between the third-party server 140 and the authentication server 150. Additionally during the first connection and upon the registration of the third-party server 140 to access the full-duplex password-less authentication service provided by the authentication server 150, a secret code will be generated on the authentication server 150 and the secret code is passed on to the administrator of the third-party server 140 to be inputted into the third-party server 140 and retransmitted to the authentication server 150 for verification, this secret code is only accessible by the person that has rightful access to the third-party server's backend code, presumably the administrator. Therefore, the third-party server 140 is the only third-party server that is able to register.

The communication channel 1250 between the authentication server 150 and the mobile device 130 provides a communication channel that is susceptible to a man-in-the-middle attack. This communication channel 1250 as mentioned previously is protected by a secure connection (e.g. using TLS) between the authentication server 150 and the mobile device 130. Messages that are transmitted between the authentication server 150 and the mobile device 130 are encrypted using the public keys of the respective parties, moreover the messages are signed by the private key that was generated by the mobile device 130 during the installation of the full-duplex password-less authentication service application on the mobile device 130 and verified by the public key that was sent to the authentication server 150. Additionally, a one-time-password (OTP) is generated on the mobile device 130 using shared static and dynamic information between the authentication server 150 and the mobile device 130. The one-time-password is sent to the authentication server 150 for verification, thus eliminating the chance for an intrusion in this communication channel 1250.

The next communication channel that is susceptible to a man-in-the-middle attack is the connection 1230 between the authentication server 150 and the push notification server 170. The connection 1230 between the authentication server 150 and the push notification server 170 uses a secure connection (e.g., using TLS) for both respective parties and generates message transmissions consequently using key pairs. Public keys are used to encrypt messages. In addition to the secure connection (e.g., using TLS), the authentication server 150 also generates a voluntary key pair (VAPID key) that is used to cryptographically sign the messages that are transmitted to the push notification server 170 and the push notification server 170 verifies the cryptographically signed messages, thus the threat of a man-in-the-middle is no longer feasible.

The communication channel 1240 between the push notification server 170 and the mobile device 130 is also susceptible to a man-in-the-middle attack. This communication is secured by encryption, for example, TLS encryption. In some embodiments, an encrypted random challenge is transmitted by the authentication server 150 that is decrypted by the mobile device 130 and re-transmitted to authentication server 150 over the communication channel 1250, thus any intrusion into the communication will result in the unappropriated response from the mobile device 130, resulting the detection of the man-in-the-middle attack.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A computer implemented method for full-duplex authentication of a user of a third-party server without requiring a password from the user, the method compromising:

pre-registering a mobile device of the user with an authentication server including generating a key pair comprising a public key and a private key, storing the private key at the mobile device, sending the public key to the authentication server, and after receiving the public key, the authentication server storing the public key in a storage of the authentication server;

a client device of the user sending a request to access the third-party server to the third-party server, the request comprising a user identifier;

the third-party server establishing a secure connection with the authentication server, the third-party server generating or obtaining a digital certificate and the authentication server validating the digital certificate;

the third-party server sending an authentication request to the authentication server, the authentication request comprising the user identifier;

the authentication server determining the mobile device of the user based upon the user identifier;

the authentication server generating a one-time password, and then, generating a picture and a code from the one-time password and sending the picture and the code to the third-party server; responsive to receiving the picture and the code at the third-party server, the third-party server forwarding the picture and the code to the client device and the client device displaying the picture and the code;

the authentication server connecting to the mobile device by a push notification server for a preliminary connection and then the authentication server connecting to the mobile device through an encrypted channel thereafter;

the push server sending the one-time password to the mobile device;

the mobile device generating the picture and the code from the one-time password and displaying the picture and the code;

the mobile device receiving an input indicative of a comparison of the picture and the code displayed on the mobile device with the picture and the code displayed on the client device;

when the input indicates that the picture and the code displayed on the mobile device match the picture and the code displayed on the client device, the request to access the third-party server is valid, the mobile device sending an authentication acknowledgment token to the authentication server and responsive to the authentication server receiving the authentication acknowledgment token, the authentication server sending a transaction to the third-party server to grant access of the third-party server by the client device.

2. The computer implemented method of claim 1, wherein after the third-party server generating or obtaining the digital certificate: the third-party generating or obtaining a private cryptographic key; the method further comprising: the third-party server obtaining a public cryptographic key that corresponds to the private cryptographic key and the third-party sending the digital certificate to the authentication server; and the authentication server receiving the digital certificate from the third-party server; and the third-party server verifying the digital certificate using the public cryptographic key.

3. The computer implemented method of claim 2, further comprising the third-party server encrypting the digital certificate before sending the digital certificate to the authentication server and the authentication server decrypting the digital certificate using the private cryptographic key before verifying the digital certificate using the public cryptographic key.

4. The computer implemented method of claim 1, wherein the request to access the third-party server further comprises a portal requester identifier, the portal requester identifier identifying the third-party server and information about the third-party server, the method further compromising authenticating the third-party server by determining that the third-party server has been pre-registered for use with the authentication server.

5. The computer implemented method of claim 1, further comprising authenticating the user identifier by determining when the user identifier has been pre-registered with the authentication server.

6. The computer implemented method of claim 1, further comprising authenticating the authentication server issuing a random challenge to the mobile device and the input including a response to the random challenge is sent from the mobile device to the authentication server and after receiving the response to the random challenge, the authentication server determining that the input was received from the mobile device.

7. The computer implemented method of claim 1, wherein when the push server sending credentials to the mobile device, the push server sending a notice to the mobile device, the notice including an identification of the user and an identification of the third-party server, the mobile device displaying the identification of the user and the identification of the third-party server.

8. The computer implemented method of claim 1, further comprising the authentication server receiving information from the third-party server indicating whether the request is a pre-registration request or the authentication request.

9. The computer implemented method of claim 1, further comprising the mobile device receiving a set of identifiers comprising a randomly generated plurality of alphanumeric characters and a number of shared values defined during the step of pre-registration, the mobile device using the set of identifiers to create the picture and the code and displaying the picture and the code on a display of the mobile device.

10. A system for full-duplex authentication of a user of a third-party server, the user having a client device and a mobile device, the system comprising:

an authentication server;

software running on the mobile device pre-registers the mobile device with the authentication server, the software running on the mobile device generates a key pair comprising a public key and a private key and sends the public key to the authentication server through a communications network where software running on the authentication server stores the public key in a memory of the authentication server;

when the software running on the third-party server receives a request to authenticate the user from the client device, the software running on the third-party server establishes a secure connection with the authentication server;

the software running on the authentication server generates a one-time password and generates a similar image with alphanumeric characters from the one-time password and forwards the similar image with alphanumeric characters to the software running on the third-party server;

the software running on the third-party server sends the similar image with alphanumeric characters to the client device and the client device displays the similar image with alphanumeric characters;

software running on the client device receives the one-time password and displays the one-time password on a display of the client device in a format consisting of a selected image and an alpha and/or numeric string;

the software running on the authentication server forwards the one-time password to software running on the mobile device through a push notification server;

software running on the mobile device receives the one-time password, generates an image with alphanumeric characters from the one-time password and displays the one-time password on a display of the mobile device;

the software running on the mobile device receives an input indicative of a visual comparison between the similar image with alphanumeric characters with the image with alphanumeric characters and when the input indicates that the similar image with alphanumeric characters match the image with alphanumeric characters, the software running on the mobile device sends a transaction to the authentication server indicating access to the third-party server is approved;

after receiving the transaction indicating access to the third-party server is approved, the software running on the authentication server sends an access token to the third-party server and, responsive to receiving the access token by the software running on the third-party server, the third-party server grants access by the client device.

11. The system for full-duplex authentication of the user of the third-party server of claim 10, wherein the authentication server validates the third-party server by way of a digital certificate of the third-party server.

12. The system for full-duplex authentication of the user of the third-party server of claim 10, wherein during pre-registration, the software running on the third-party server generates a cryptographic key pair, stores a private key of the cryptographic key pair and sends a cryptographic public key of the cryptographic key pair to the authentication server, upon receiving the cryptographic public key of the cryptographic key pair, the software running on the authentication server stores the cryptographic public key of the cryptographic key pair; and thereafter all communications between the third-party server and the authentication server are encrypted and decrypted using the cryptographic key pair.

13. The system for full-duplex authentication of the user of the third-party server of claim 10, wherein the software running on the third-party server sends a portal identifier to the software running on the authentication server that identifies a portal of the third-party server that the user is attempting to access and the software running on the authentication server further authenticates the portal by determining that the portal has been pre-registered for use with the authentication server.

14. The system for full-duplex authentication of the user of the third-party server of claim 13, where the software running on the authentication server includes information that identifies the portal and a date or time with the similar image with alphanumeric characters for display at the client device.

15. A method for full-duplex authentication of a user of a third-party server without requiring a password from the user, the user having a user-ID, the method compromising:

pre-registering the user of the full-duplex authentication by requesting access to the full-duplex authentication at the third-party server by the user, providing the user-ID, the third-party server forwarding the user-ID to an authentication server, the authentication server generating a registration code embedded in a QR code and sending the QR code to the client device where the QR code is displayed, scanning the QR code at the mobile device and installing an authentication application on the mobile device, the authentication application displaying the registration code, after inputting of the registration code into a field displayed on the client device, the registration code is sent to the authentication server and responsive to receiving the registration code, the authentication application running on the mobile device generating a cryptographic key pair and sending a public key of the cryptographic key pair along with the registration code to the authentication server, the authentication server checking the registration code and saving the public key;

after pre-registering of the user, when the user attempts to access the third-party server at the client device, the client device sending a request to access the third-party server to the third-party server, the request comprising a user-ID;

the third-party server establishing a secure connection with the authentication server and the authentication server validating the third-party server by way of a digital certificate;

the third-party server sending an authentication request to the authentication server, the authentication request comprising the user-ID;

the authentication server determining the mobile device of the user based upon the user-ID;

the authentication server generating a one-time password, then generating a similar image and alphanumeric characters from the one-time password, and sending the similar image and alphanumeric characters to the third-party server; responsive to receiving the similar image and alphanumeric characters at the third-party server, the third-party server forwarding the similar image and alphanumeric characters to the client device and the client device displaying the similar image and alphanumeric characters;

the authentication server connecting to the mobile device by a push notification server for a preliminary connection and then the authentication server connecting to the mobile device through an encrypted channel thereafter;

the authentication server sending the one-time password to the mobile device;

the mobile device generating an image and alphanumeric characters from the one-time password and displaying the image and alphanumeric characters;

the mobile device receiving an input indicative of a comparison of the image and alphanumeric characters displayed on the mobile device with the similar image and alphanumeric characters displayed on the client device;

when the input indicates that the image and alphanumeric characters displayed on the mobile device match the similar image and alphanumeric characters displayed on the client device, the request to access the third-party server is valid and the mobile device sending an authentication acknowledgment token to the authentication server;

responsive to the authentication server receiving the authentication acknowledgment token, the authentication server sending a transaction to the third-party server, the transaction granting access of the third-party server by the client device.

16. The method of claim 15, wherein after the third-party server receiving the transaction granting access of the third-party server; the third-party server providing services to the client device.

17. The method of claim 15, wherein the request to access the third-party server further comprises a portal requester identifier, the portal requester identifier identifying the third-party server and information about the third-party server, the method further compromising authenticating the third-party server by determining that the third-party server has been pre-registered for use with the authentication server.

18. The method of claim 15, wherein the one-time password is created using a unique seed that was generated at the authentication server during pre-registering, the authentication server further sending the unique seed to the mobile device during the pre-registration and the mobile device storing the unique seed.

19. The method of claim 18, wherein the seed is generated by a unique seed server.

\* \* \* \* \*